Aug. 30, 1949.　　　　　J. W. DAWSON　　　　　2,480,635
APPARATUS FOR ELECTRIC WELDING
Filed Aug. 10, 1945
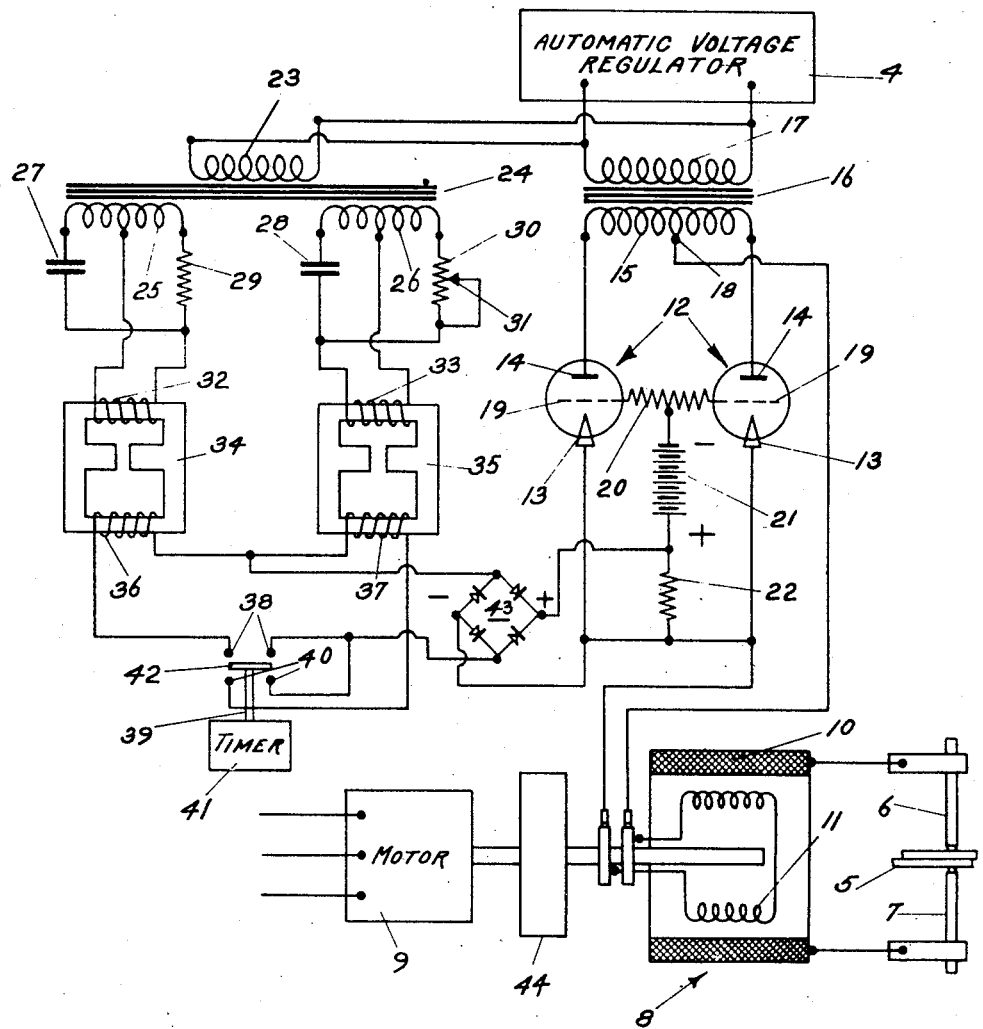
INVENTOR.
JOHN W. DAWSON,
By Elmer J. Gorn
ATTY.

Aug. 30, 1949

2,480,635

UNITED STATES PATENT OFFICE 2,480,635

APPARATUS FOR ELECTRIC WELDING

John W. Dawson, West Newton, Mass., assignor to Raytheon Manufacturing Company, Newton, Mass., a corporation of Delaware Application August 10, 1945, Serial No. 610,140

4 Claims. (Cl. 322—73)

This invention relates to a resistance welding system, and more particularly to such a system in which the welding current is supplied to the welding load from a motor-generator, and the welding energy is controlled by varying the field of the generator.

It is among the objects of the present invention to provide a system of the type described in which the field of the generator is forced up and down to control the initiation and termination of the supply of welding energy to the work.

It is a further object of the invention to provide a system of the type described in which a large portion of the welding energy is stored in the rotating parts of the motor-generator or in masses associated therewith during the periods between successive welds whereby the demand upon the power supply line is more evenly distributed.

It is a further object of the invention to provide a system of the type described in which the decay energy in the field winding of the generator is forced down rapidly to provide a sharp termination of the supply of welding energy to the load. The sharp termination of the welding energy permits the welding machine to operate more rapidly, since the welding electrodes can be removed from the work without waiting for a relatively long decay period.

The above and other objects and features of the invention will be made fully apparent to those skilled in the art from a consideration of the following detailed description taken in conjunction with the accompanying drawing, forming a part hereof, and in which the single figure shows a schematic diagram of a resistance welding system embodying my invention.

Referring to the drawing, reference numeral 5 indicates the work adapted to be engaged by welding electrodes 6 and 7 to which welding current is supplied from a low voltage, high current generator 8. The generator 8 may be driven from any suitable source of power. In the instance shown it is driven by a motor 9 which is supplied with current from a commercial three-phase power supply line. The generator 8 includes an armature winding 10, the opposite ends of which are connected to the welding electrodes 6 and 7, and a rotating field winding 11.

The field winding 11 is supplied with direct current from a rectifying circuit including a pair of rectifying tubes 12. These tubes may be of gas or vapor-filled type having permanently energized cathodes 13. These cathodes may be of the thermionic filament or of any other suitable type of cathode. The rectifier tubes 12 are provided with anodes 14 which are connected to the opposite sides of the secondary winding 15 of a transformer 16. The transformer 16 is provided with a primary winding 17, the opposite ends of which are connected to a suitable source of alternating current. Preferably the alternating current supply is taken from the same source as the supply of the motor 9, and regulated in an automatic voltage regulator 4 to over-compensate for variations in the line voltage. Thus, if the line voltage falls so that the speed of the motor 9 tends to decrease, then the supply of current to the transformer 16 is increased. Hence, the rectified current supplied to the field winding 11 is increased to maintain the output of the generator 8 at a desired value regardless of variations in line voltage. The cathodes 13 are jointly connected at one end of the field winding 11, the opposite end of which is connected to a center tap 18 on the secondary winding 15 of the transformer 16.

In order to time the flow of current to the field winding 11 of the generator 8 and thus control the timing of the supply of welding energy to the work 5, the tubes 12 are provided with control grids 19. The grids 19 are connected through a common resistor 20 to the negative terminal of a battery 21, the positive terminal of which is connected to the cathodes 13 through a resistor 22. The battery 21 thus supplies a potential to the cathode-grid circuits of the tubes 12 which would normally block a conduction through these tubes.

In order to control the firing of the tubes 12 both with respect to the initiation of the supply of energizing current to the coil 11, the value of this current, and the feedback of the residual energy at the end of a welding period, the grids 19 are supplied with peaked voltage impulses which impulses are phase-shifted with respect to the cathode-plate voltage. The phase shift is such that the peaked voltage impulses occur during the early portion of the half wave of voltage across either tube during the initial portion of a welding period when it is desired to drive the field generator up, and during the latter portion of the half wave when it is desired to drive the field generator down to terminate a welding period. Preferably, the angle by which the peaked voltage impulses supplied to the cathode-grid circuit lead the cathode-plate voltages during the initial portion of the welding period may be varied within limits to control the amount of current supplied to the field winding 11. The angle by which the peaked voltage impulses lag the cathode-plate voltages during the latter portion of a welding period may be constant. Various phase-shifting circuits are known in the art and may be utilized to supply the peaked voltage impulses. In the instance shown the primary winding 23 of a transformer 24 is connected across the same alternating current supply line as the transformer 16. A pair of phase-shifting circuits, one for supplying energizing impulses to the grids 19, which impulses lead the cathode-plate voltage across the tubes 12, and the other for supplying impulses which lag the cathode-plate voltage, are supplied by providing the transformer 24 with a pair of secondary windings 25 and 26, the end terminals of each of which are connected to separate phase-shifting circuits. The phase-shifting circuits of the secondary windings 25 and 26 include condensers 27 and 28 and resistors 29 and 30, respectively. The resistor of whichever of the phase-shifting circuits is intended to supply the leading impulses, in this instance the resistor 30, is adjustable through an adjustable tap 31. It will be understood that either one or both of the phase-shifting circuits may include an inductance in place of either the resistor or the condenser or in conjunction with both of these elements in a manner known in the art. The secondary winding 25 is provided with a center tap connected to one of the terminals of the primary winding 32 of a peaking transformer 34, the other terminal of which is connected to the phase-shifting circuit of the secondary winding 25 at a point between the condenser 27 and the resistor 29. The secondary winding 26 also has a center tap connected to one end of a primary winding 33 on a second peaking transformer 35. The other terminal of a primary winding 33 of the transformer 35 is connected to the phase-shifting circuit of the secondary winding 26 at a point between the condenser 28 and the resistor 30. The secondary windings 36 and 37 of the peaking transformers 34 and 35 have a common terminal connected to the grids 19 through the battery 21. The other terminal of the secondary winding 36 is connectable to cathodes 13 through a pair of contacts 38 of a relay 39. The secondary winding 37 is also connectable to the cathodes 13 through a second pair of contacts 40 controlled by relay 39. The actuation of relay 39 is controlled by a timing device 41 adapted to move the armature 42 of the relay 39 into one of three positions. These positions include the position in which the contacts 38 are closed, the position in which the contacts 40 are closed, and a neutral position in which both sets of contacts are open. A bridge rectifier 43 is interposed between the phase-shifting circuits and the cathode-grid circuit in order to insure that the impulses are always delivered in a direction to drive the grids positive.

In operation, assuming that the motor 9 is being supplied with current at a time when one or both of the electrodes 6 and 7 are disengaged from the work 5, the armature 42 of the relay 39 will be in neutral position. A blocking potential is supplied to the control grids 19 of tubes 12 from the battery 21, and no energizing current will be supplied to the coil 11 of the generator 8. Under these conditions kinetic energy will be stored in the rotating parts of the motor-generator 8 and 9. In order to increase the quantity of energy that may be stored in the rotating parts, a fly wheel 44 may be associated with the moving parts in order to increase the mass thereof. Upon the movement of the electrodes 6 and 7 into engagement with the work, the timer circuit 41 is closed to energize the relay 39. Suitable timing circuits, controlled either manually or in response to the closure of the electrodes upon the work, are known in the art, and the details thereof are not here shown. When so actuated, the contacts 40 will be closed to supply a pulse of current through the rectifier 43 to the control grids 19, which pulse of current is of such magnitude and direction that the grids 19 are driven positive. It will be understood that the positive pulse of current for energizing the grids 19 is shifted in a phase by the phase-shifting circuit to occur during the initial portion of a half wave of current upon either of the tubes 12. The tubes 12 are then alternately fired to supply rectified current to the coil 11 of the generator 8, and a high current of low voltage is generated in the winding 10 of the generator 8, which winding is directly connected to the electrodes 6 and 7 to supply welding energy to the work 5. After a predetermined time, controlled by the timer 41, the armature 42 of the relay 39 is moved to open the contacts 40 and close the contacts 38. At this time a considerable amount of energy is stored in the system including the coil 11. This energy tends to maintain current through the coil 11 in the same direction as before. Since one or the other of the tubes 12 is conductive at this time, the decay energy from the coil 11 applies a voltage across this tube which maintains conduction therethrough. This tube remains conductive during the next succeeding half wave or alternation of the alternating current applied from the transformer 16. Thus, upon a reversal of the energy supplied by the transformer 16, the tube which was conductive during the immediately preceding alternation remains conductive. The other tube, however, is not fired. Thus, when the direction of current through the secondary winding 15 of the transformer 16 has reversed, this half wave of current tends to oppose the decay current from the coil 11. This forces the field of the generator down rapidly. Although the decay current may persist over a number of alternations or half waves of the current applied by the transformer 16 across the tubes 12, the direction of this current is opposed to the direction of the decay current. This is due to the fact that during the decay period positive energizing impulses are supplied to the grids 19 from the transformer 34. These impulses occur toward the end of each alternation. One of the tubes 12, say the left-hand tube, will have a voltage impressed across its cathode-plate circuit which is the combined voltage of the decay current and the instantaneous voltage applied by the transformer 16. Across the right-hand tube these two voltages will be in opposition. The left-hand tube having the higher impressed voltage will conduct. The right-hand tube will go out. Thus, for a brief instant, constituting but a few degrees of each alternation, the current supplied by the transformer 16 and the decay current from the coil 11 are in the same direction through the left-hand tube. However, the current applied by the transformer 16 reverses immediately after the firing of the left-hand tube. Thus, the current from the coil 11 is again in opposition to the applied voltage. This condition continues until the decay energy is fully offset by the applied voltage. Thereupon the armature 42 of the timer 41 is moved to neutral position. Thereafter neither of tubes 12 can be fired due to the blocking potential applied to the grids 19 by the battery 21 until the next succeeding welding operation when the timer 41 again actuates the relay 39. During the period between successive welds, kinetic energy is again stored in the moving parts of the motor-generator for use during the next succeeding welding operation. It will be understood that the counter m. m. f. of the generator 8 may be opposed by the application of a high regulated voltage applied to the field.

From the foregoing it will be seen that the invention provides a system which eliminates the necessity for a welding transformer between the motor of a motor-generator unit and the work to be welded. Furthermore, the system permits the accurate control of the energy to the welding load without the necessity for tubes or other switching devices in the circuits carrying the high welding energy. Only the current to the field coil of the generator need be controlled, and the energy in this circuit, whether this be the direct energy received from the source or the decay energy in the system, is accurately controlled to effect a corresponding control in the energy supplied to the welding load.

Although there has been herein described a preferred embodiment of the invention, other embodiments within the scope of the appended claims will be apparent to those skilled in the art from a consideration of the forms shown and the teachings hereof. Accordingly, a broad interpretation of the appended claims commensurate with the scope of the invention within the art is desired.

What is claimed is:

1. An electrical system comprising, a generator having an armature and a field winding, a load circuit directly connected to said armature, a source of alternating current, a pair of controlled ignition gas-filled discharge rectifier tubes connected in a full-wave rectifying circuit between said source and said field winding, each of said tubes having a cathode, an anode, and an ignition-controlling member, a control network having a first circuit condition in which said network applies an igniting voltage to each of said members early in each half cycle during which the anode of said member is positive with respect to its cathode and a second circuit condition in which said network applies an igniting voltage to each of said members late in said half cycle, and transfer means instantaneously transferring said network from said first to said second circuit conditions.

2. An electrical system comprising, a generator having an armature and a field winding, a load circuit directly connected to said armature, a source of alternating current, a pair of controlled ignition gas-filled discharge rectifier tubes connected in a full-wave rectifying circuit between said source and said field winding, each of said tubes having a cathode, an anode, and an ignition-controlling member, a control network having a first circuit condition in which said network applies an igniting voltage to each of said members early in each half cycle during which the anode of said member is positive with respect to its cathode and a second circuit condition in which said network applies an igniting voltage to each of said members late in said half cycle, transfer means instantaneously transferring said network from said first to said second circuit conditions, and timing means for energizing said transfer means at a predetermined time after said first network condition has been established.

3. An electrical system comprising, a generator having an armature and a field winding, a load circuit directly connected to said armature, a source of alternating current, a pair of controlled ignition gas-filled discharge rectifier tubes connected in a full-wave rectifying circuit between said source and said field winding, each of said tubes having a cathode, an anode, and an ignition-controlling member, a first pulse means supplying an igniting impulse to each of said members early in each half cycle during which the anode of said member is positive with respect to its cathode, a second pulse means for supplying an igniting impulse to each of said members late in each half cycle during which the anode of said member is positive with respect to its cathode and relay means first connecting said first pulse means to said members and thereafter connecting said second pulse means to said members.

4. An electrical system comprising, a generator having an armature and a field winding, a load circuit directly connected to said armature, a source of alternating current, a pair of controlled ignition gas-filled discharge rectifier tubes connected in a full-wave rectifying circuit between said source and said field winding, each of said tubes having a cathode, an anode, and an ignition-controlling member, a first pulse means supplying an igniting impulse to each of said members early in each half cycle during which the anode of said member is positive with respect to its cathode, a second pulse means for supplying an igniting impulse to each of said members late in each half cycle during which the anode of said member is positive with respect to its cathode, and relay means first connecting said first pulse means to said members and at a predetermined time thereafter connecting said second pulse means to said members.

JOHN W. DAWSON.

REFERENCES CITED

The following references are of record in the file of this patent:

UNITED STATES PATENTS

| Number | Name | Date |
|---|---|---|
| 1,061,375 | Heany | May 13, 1913 |
| 1,456,955 | Wagner | May 29, 1923 |
| 1,671,641 | Holmes | May 29, 1928 |
| 2,083,297 | Gulliksen et al. | June 8, 1937 |
| 2,147,381 | List et al. | Feb. 14, 1939 |
| 2,301,424 | List | Nov. 10, 1942 |

FOREIGN PATENTS

| Number | Country | Date |
|---|---|---|
| 362,309 | Italy | Aug. 22, 1938 |